US012693744B2

(12) United States Patent (10) Patent No.: US 12,693,744 B2
Chang (45) Date of Patent: Jul. 28, 2026

(54) METHOD FOR CONTROLLING VIEW ANGLE, HOST, AND COMPUTER READABLE STORAGE MEDIUM

(71) Applicant: HTC Corporation, Taoyuan City (TW)

(72) Inventor: Yi-Hsin Chang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 52 days.

(21) Appl. No.: 18/597,887

(22) Filed: Mar. 6, 2024

(65) Prior Publication Data

US 2025/0093960 A1 Mar. 20, 2025

Related U.S. Application Data

(60) Provisional application No. 63/538,850, filed on Sep. 18, 2023.

(51) Int. Cl.
*G06F 3/01* (2006.01)
*G06T 3/40* (2024.01)
*G06T 11/10* (2026.01)

(52) U.S. Cl.
CPC ............... *G06F 3/017* (2013.01); *G06T 3/40* (2013.01); *G06T 11/10* (2026.01)

(58) Field of Classification Search
CPC .......... G06T 3/40; G06T 11/001; G06F 3/011; G06F 3/0304; G06F 3/017
See application file for complete search history.

(56) References Cited

U.S. PATENT DOCUMENTS

2016/0306431 A1* 10/2016 Stafford ............... G02B 27/017
2020/0387213 A1* 12/2020 Ravasz ................... G06F 3/011
2023/0195236 A1* 6/2023 Sun ......................... G06F 3/017
345/157

* cited by examiner

*Primary Examiner* — Abhishek Sarma
(74) *Attorney, Agent, or Firm* — JCIPRNET

(57) ABSTRACT

The embodiments of the disclosure provide a method for controlling a view angle, a host, and a computer readable storage medium. The method includes: providing a visual content, wherein the visual content has a field of view (FOV) corresponding to a first view angle; in response to determining that a preparation gesture is detected, displaying a visual cue in the visual content, wherein the visual cue indicates a first direction; and in response to determining that the preparation gesture has been changed to a first gesture corresponding to the first direction, adjusting the FOV to correspond to a second view angle based on the first direction.

19 Claims, 10 Drawing Sheets

METHOD FOR CONTROLLING VIEW ANGLE, HOST, AND COMPUTER READABLE STORAGE MEDIUM

CROSS-REFERENCE TO RELATED APPLICATION

This application claims the priority benefit of U.S. provisional application Ser. No. 63/538,850, filed on Sep. 18, 2023. The entirety of the above-mentioned patent application is hereby incorporated by reference herein and made a part of this specification.

BACKGROUND

1. Field of the Invention

The present disclosure generally relates to a mechanism for controlling a visual content, in particular, to a method for controlling a view angle of a visual content, a host, and a computer readable storage medium.

2. Description of Related Art

Nowadays, the applications of virtual reality (VR) technology are getting more and more wide. In general, people often experience the VR service by wearing a head-mounted display (HMD), and the HMD can show a visual content of the VR world of the corresponding VR service.

When experiencing the VR service with the HMD, the user may move his/her head or body to change the field of view (FOV) to different view angles to see different parts of the VR world. However, in some cases, it may be difficult for the user to move his/her head or body. Therefore, it is crucial to develop a new solution for facilitating the user to change the FOV to different view angles.

SUMMARY OF THE INVENTION

Accordingly, the disclosure is directed to a method for controlling a view angle, a host, and a computer readable storage medium, which may be used to solve the above technical problems.

The embodiments of the disclosure provide a method for controlling a view angle, executed by a host. The method includes: providing, by the host, a visual content, wherein the visual content has a field of view (FOV) corresponding to a first view angle; in response to determining that a preparation gesture is detected, displaying, by the host, a visual cue in the visual content, wherein the visual cue indicates a first direction; and in response to determining that the preparation gesture has been changed to a first gesture corresponding to the first direction, adjusting, by the host, the FOV to correspond to a second view angle based on the first direction.

The embodiments of the disclosure provide a host including a storage circuit and a processor. The storage circuit stores a program code. The processor is coupled to the non-transitory storage circuit and accesses the program code to perform: providing a visual content, wherein the visual content has a field of view (FOV) corresponding to a first view angle; in response to determining that a preparation gesture is detected, displaying a visual cue in the visual content, wherein the visual cue indicates a first direction; and in response to determining that the preparation gesture has been changed to a first gesture corresponding to the first direction, adjusting the FOV to correspond to a second view angle based on the first direction.

The embodiments of the disclosure provide a computer readable storage medium, the computer readable storage medium recording an executable computer program, the executable computer program being loaded by a host to perform steps of: providing a visual content, wherein the visual content has a field of view (FOV) corresponding to a first view angle; in response to determining that a preparation gesture is detected, displaying a visual cue in the visual content, wherein the visual cue indicates a first direction; and in response to determining that the preparation gesture has been changed to a first gesture corresponding to the first direction, adjusting the FOV to correspond to a second view angle based on the first direction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

See

DESCRIPTION OF THE EMBODIMENTS

Figure 1:
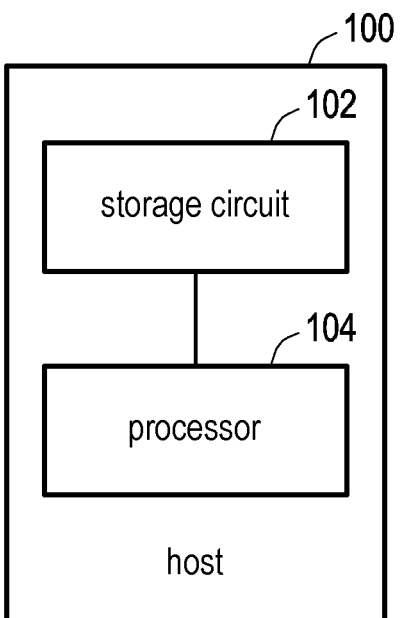
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any device capable of performing tracking functions (e.g., inside-out tracking and/or outside-in tracking) on one or more to-be-tracked objects (e.g., the hands of the user of the host 100) within a tracking range of the host 100. In the embodiments of the disclosure, the host 100 may be configured with a tracking camera having an image-capturing range corresponding to the tracking range. When the to-be-tracked objects (e.g., the hands) is within the tracking range, the cameras on the host 100 may capture images of the to-be-tracked objects, and the host 100 may track the pose of each to-be-tracked object based on the captured images, but the disclosure is not limited thereto.

In some embodiments, the host 100 can track the hand gesture(s) of the hand(s) in the tracking range and accordingly render the corresponding hand object(s) in the provided visual content.

In various embodiments, the host 100 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 100 can be a head-mounted display (HMD) capable of showing/providing visual contents (e.g., AR/VR contents)

for the wearer/user to see. For better understanding the concept of the disclosure, the host 100 would be assumed to be the HMD for providing VR contents (e.g., the VR world) to the user, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules stored in the storage circuit 102 to implement the method for controlling a view angle of a visual content provided in the disclosure, which would be further discussed in the following.

Figure 2:
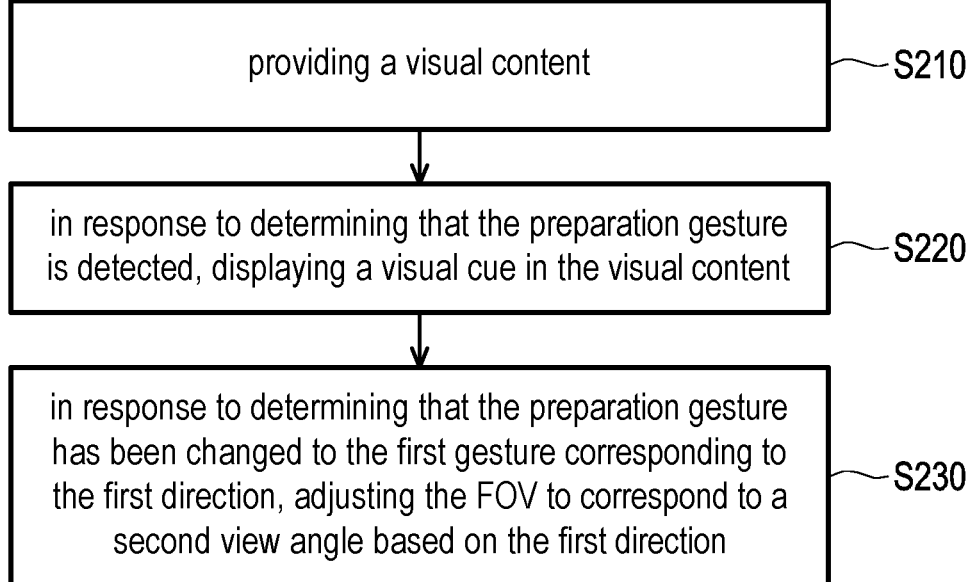
FIG. 2 shows a flow chart of the method for controlling a view angle of a visual content according to an embodiment of the disclosure.

See FIG. 2, which shows a flow chart of the method for controlling a view angle of a visual content according to an embodiment of the disclosure. The method of this embodiment may be executed by the electronic device 100 in FIG. 1, and the details of each step in FIG. 2 will be described below with the components shown in FIG. 1. For better understanding the concept of the disclosure, FIG. 3A to FIG. 3I would be used as an example, wherein FIG. 3A to FIG. 3I show an application scenario according to an embodiment of the disclosure.

In step S210, the processor 104 provides a visual content, wherein the visual content has a field of view (FOV) corresponding to a first view angle.

Figures 3A, 3B:
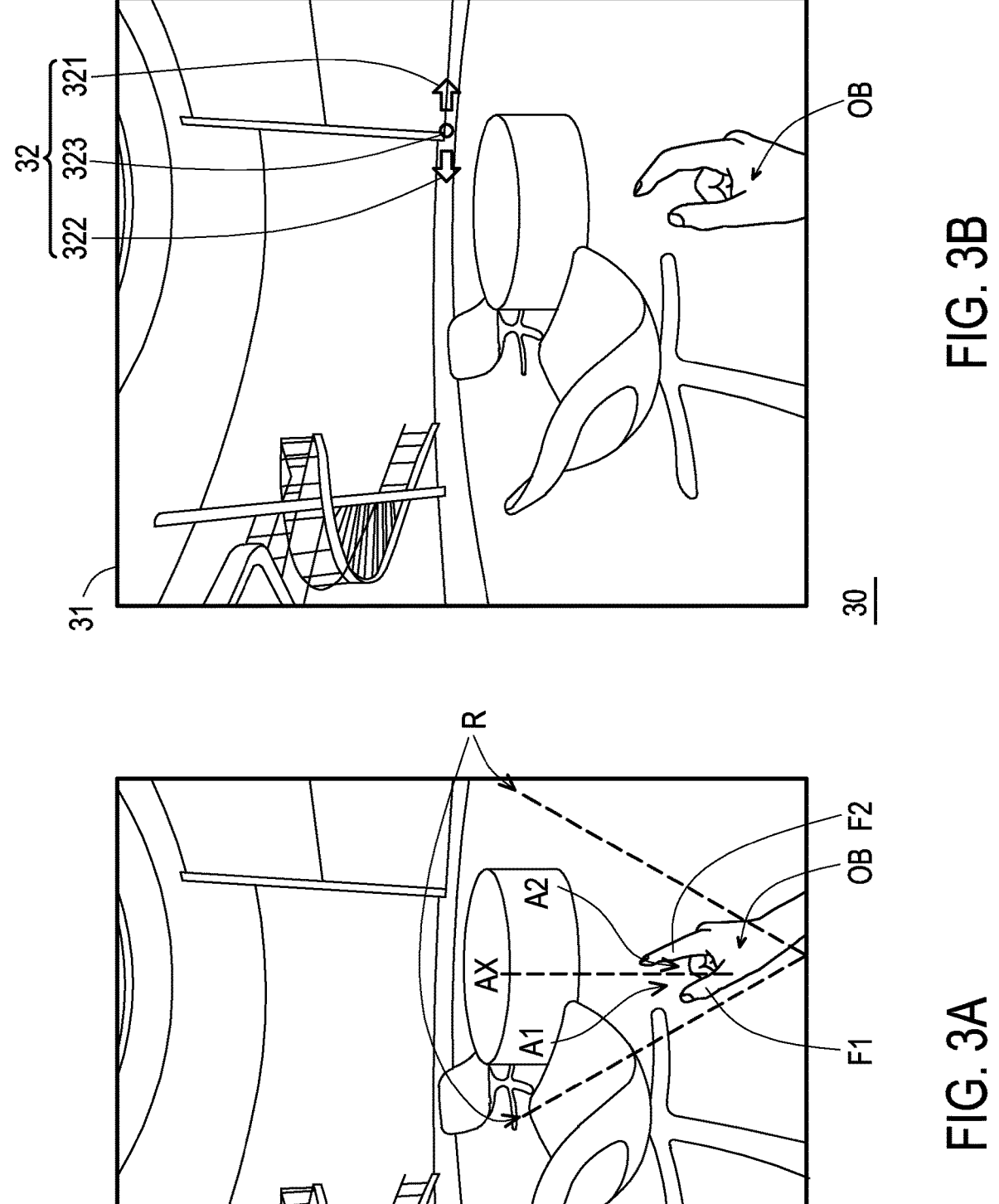
FIG. 3A to FIG. 3I show an application scenario according to an embodiment of the disclosure.

In FIG. 3A, the visual content 30 may be the visual content considered in step S210, and the FOV 31 may be the FOV corresponding to the first view angle. In addition, the processor 104 may further provide the hand object OB rendered based on the tracked hand gesture of the user of the host 200. Since the appearance/shape/gesture of the hand object OB corresponds to the tracked hand gesture of the user, the hand object OB would be used to describe the operations related to the hand gesture for visual aid, but the disclosure is not limited thereto.

In the embodiments of the disclosure, the processor 104 may determine whether a preparation gesture is detected. In one embodiment, the processor 104 may determine whether the tracked hand gesture satisfies a predetermined condition. In response to determining that the hand gesture satisfies the predetermined condition, the processor 104 may determine that the preparation gesture is detected, otherwise the processor 104 may determine that the preparation gesture is not detected.

In different embodiments, the processor 104 may determine whether the hand gesture satisfies the predetermined condition based on one or a combination of the following first embodiment and a second embodiment, but the disclosure is not limited thereto.

In the embodiments of the disclosure, the tracked hand gesture includes a first finger (e.g., a thumb) and a second finger (e.g., an index finger), which may respectively correspond to the first finger F1 and the second finger F2 on the hand object OB in FIG. 3A.

In the first embodiment, the processor 104 may determine a first angle A1 between the first finger F1 and a reference axis AX (e.g., a vertical axis) and determine a second angle A2 between the second finger F2 and the reference axis AX. Next, the processor 104 may determine whether the first angle A1 and the second angle A2 are within a predetermined angle range. In various embodiments, the predetermined angle range may be determined based on the requirements of the designer. In FIG. 3A, the predetermined angle range may be assumed to be ranged between −30 degrees to +30 degrees, but the disclosure is not limited thereto.

In one embodiment, in response to determining that the first angle A1 and the second angle A2 are within the predetermined angle range, the processor 104 may determine that the hand gesture satisfies the predetermined condition, otherwise the processor 104 may determine that the hand gesture does not satisfy the predetermined condition, but the disclosure is not limited thereto.

In the second embodiment, the hand gesture may include a palm, which may correspond to the palm of the hand object OB. In this case, the processor 104 may determine whether the palm is within a predetermined sub-range R in the FOV 31. In various embodiments, the predetermined sub-range R may be determined based on the requirements of the designer. In FIG. 3A, the predetermined sub-range R may be assumed to be ranged between horizontal −15 degrees to +15 degrees of the FOV 31, but the disclosure is not limited thereto.

In one embodiment, in response to determining that the palm is within the predetermined sub-range R in the FOV 31, the processor 104 may determine that the hand gesture satisfies the predetermined condition, otherwise the processor 104 may determine that the hand gesture does not satisfy the predetermined condition, but the disclosure is not limited thereto.

In one embodiment, the processor 104 may determine whether the hand gesture satisfies the predetermined condition based on a combination of the first and second embodiment. For example, the processor 104 may determine whether the first angle A1 and the second angle A2 are within the predetermined angle range and whether the palm is within the predetermined sub-range R in the FOV 31. In response to determining that the first angle A1 and the second angle A2 are within the predetermined angle range and the palm is within the predetermined sub-range R in the FOV 31, the processor 104 may determine that the hand gesture satisfies the predetermined condition, otherwise the processor 104 may determine that the hand gesture does not satisfy the predetermined condition, but the disclosure is not limited thereto.

In step S220, in response to determining that the preparation gesture is detected, the processor 104 displays a visual cue in the visual content, wherein the visual cue indicates a first direction.

See FIG. 3B, the hand gesture presented by the hand object OB can be assumed to be an example of the considered preparation gesture, wherein the first finger F1 and the second finger F2 substantially point upward, and the palm is within the predetermined sub-range R, but the disclosure is not limited thereto.

In this case, the processor 104 may display the visual cue 32 in the visual content 30. In FIG. 3B, the visual cue 32 may include a first directional indicator 321, a second directional indicator 322, and a reference object 323. In the embodiment, the first directional indicator 321 may indicate the first direction (e.g., right), the second directional indicator 322 may indicate a second direction (e.g., left), wherein the second direction is different from the first direction.

In other embodiments, the visual cue 32 can be modified into different appearances based on the requirements of the designer. For example, the visual cue 32 may be modified to include only one of the first directional indicator 321, the second directional indicator 322, and the reference object 323. Additionally or alternatively, the visual cue 32 may be modified to have the first directional indicator 321 and the second directional indicator 322 indicating other directions (e.g., directions perpendicular to each other). In one embodiment, the visual cue 32 can be modified to have more directional indicators indicating the directions other than the first and/or second direction, such as directional indicators indicating upward and/or downward, but the disclosure is not limited thereto.

In one embodiment, the processor 104 may determine whether the preparation gesture has been changed to a first gesture corresponding to the first direction.

In different embodiments the first gesture corresponding to the first direction can be arbitrarily designed based on the requirements of the designer. In a third embodiment, the first gesture corresponding to the first direction may be a pinch-and-release gesture moving toward the first direction. In a fourth embodiment, the first gesture corresponding to the first direction may be a pinch gesture moving toward the first direction for more than a predetermined time length and/or a predetermined distance, but the disclosure is not limited thereto.

In step S230, in response to determining that the preparation gesture has been changed to the first gesture corresponding to the first direction, the processor 104 adjusts the FOV to correspond to a second view angle based on the first direction.

In the third embodiment, the processor 104 may determine whether the preparation gesture has been changed to the pinch-and-release gesture moving toward the first direction. For example, after detecting the preparation gesture, the processor 104 may determine whether the distance between the fingertips of the first finger F1 and the second finger F2 is (gradually) reduced to be substantially zero (e.g., the fingertips of the first finger F1 and the second finger F2 touch each other). If yes, the processor 104 may determine that the pinch part of the pinch-and-release gesture has been detected. In this case, the processor 104 may further determine whether the fingertips of the first finger F1 and the second finger F2 have been separated after the hand gesture has moved toward the first direction while maintaining the pinch part of the pinch-and-release gesture. If yes, the processor 104 may determine that the release part of the pinch-and-release gesture has been detected.

In this case, the processor 104 may determine that the preparation gesture has been changed to the pinch-and-release gesture moving toward the first direction, and accordingly determine that the preparation gesture has been changed to the first gesture corresponding to the first direction. Next, the processor 104 may adjust the FOV 31 to correspond to the second view angle based on the first direction.

In the fourth embodiment, the processor 104 may determine whether the preparation gesture has been changed to the pinch-and-release gesture moving toward the first direction in other ways. For example, after detecting the preparation gesture, the processor 104 may determine whether the distance between the fingertips of the first finger F1 and the second finger F2 is (gradually) reduced to be substantially zero (e.g., the fingertips of the first finger F1 and the second finger F2 touch each other). If yes, the processor 104 may determine that the pinch gesture has been detected. In this case, the processor 104 may further determine whether the pinch gesture has moved toward the first direction for more than the predetermined time length and/or the predetermined distance. If yes, the processor 104 may determine that the pinch gesture moving toward the first direction for more than the predetermined time length and/or the predetermined distance has been detected. In this case, the processor 104 may determine that the preparation gesture has been changed to the first gesture corresponding to the first direction. Next, the processor 104 may adjust the FOV 31 to correspond to the second view angle based on the first direction.

In the embodiments of the disclosure, the processor 104 may further vary an appearance of the reference object 323 in a process of the preparation gesture being changed to the first gesture corresponding to the first direction.

In one embodiment, the processor 104 may perform one or a combination of the following operations to vary the appearance of the reference object 323: (1) reducing a size of the reference object 323 in the process of the preparation gesture being changed to the first gesture corresponding to the first direction; (2) changing a color of the reference object 323 in the process of the preparation gesture being changed to the first gesture corresponding to the first direction, but the disclosure is not limited thereto.

Figure 3D:
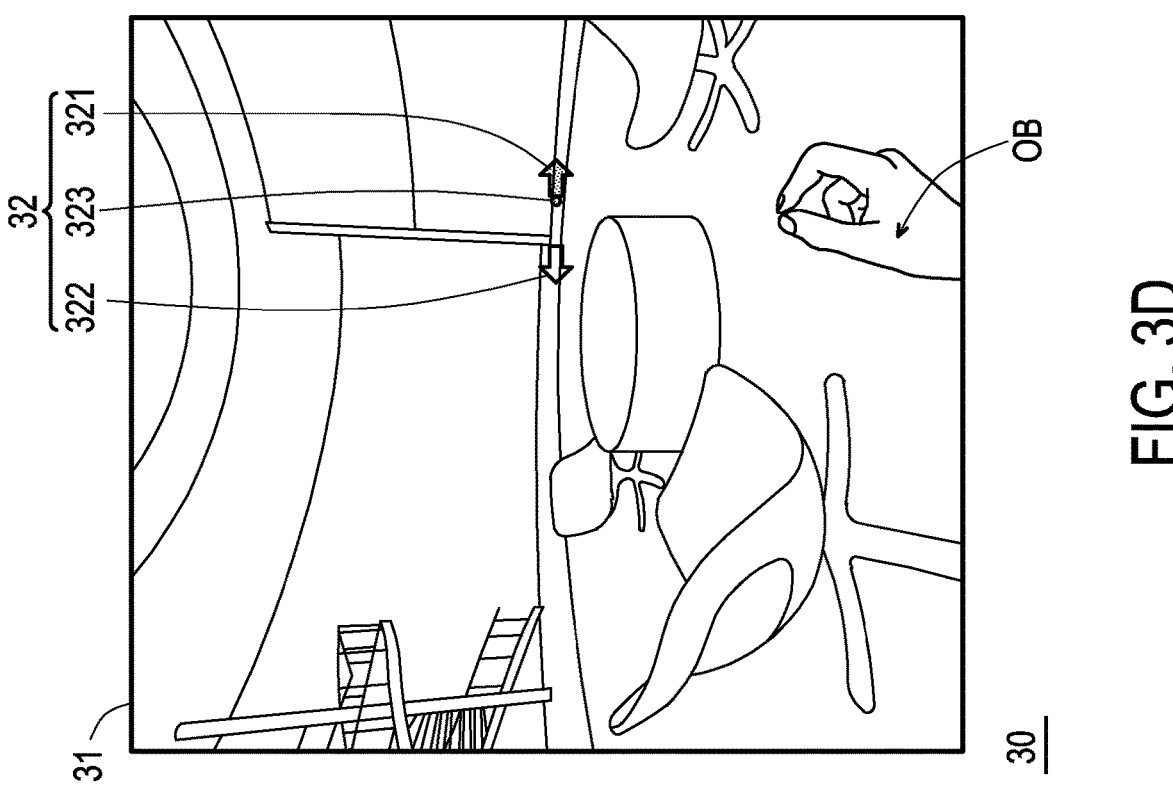
Figure 3C:
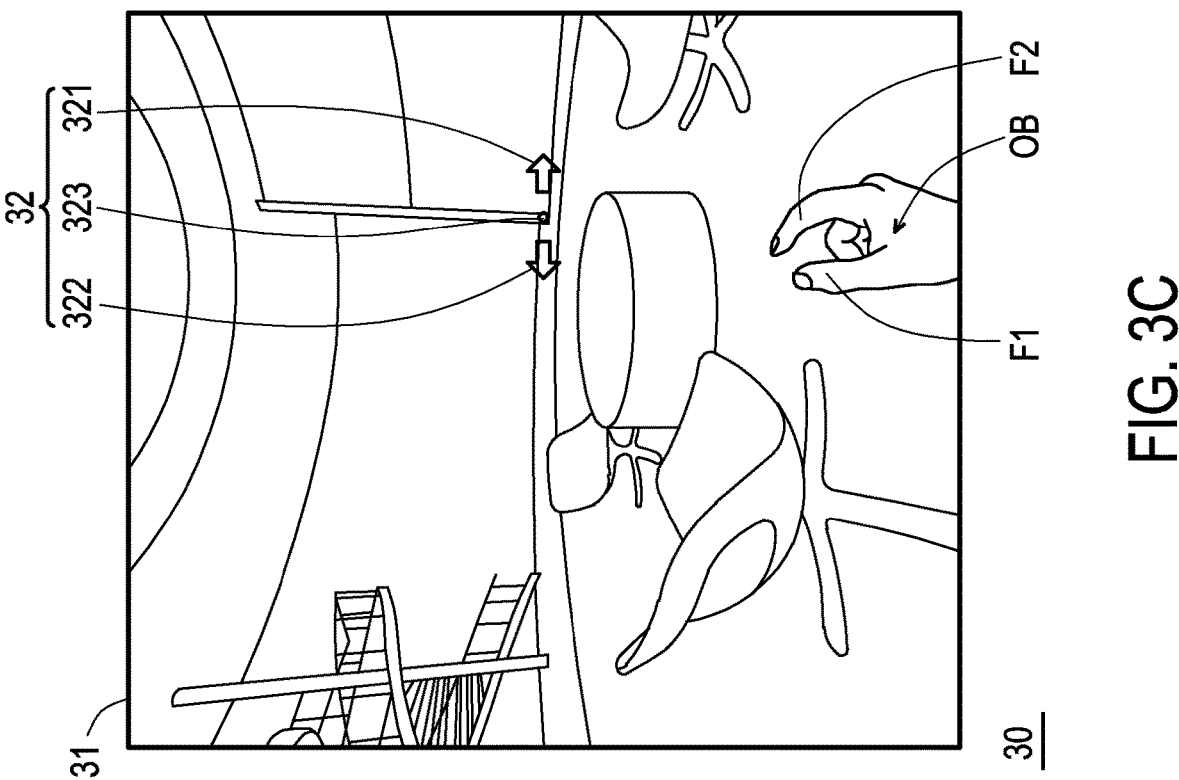

See FIG. 3C, when the distance between the first finger F1 and the second finger F2 is getting smaller, the size of the reference object 323 can be reduced accordingly. In one embodiment, the size of the reference object 323 can be positively related to the distance between the first finger F1 and the second finger F2. That is, the smaller the distance between the first finger F1 and the second finger F2, the smaller the size of the reference object 323 is, but the disclosure is not limited thereto.

Additionally or alternatively, when the distance between the first finger F1 and the second finger F2 is getting smaller, the color of the reference object 323 can be adjusted accordingly. In one embodiment, the darkness of the color of the reference object 323 can be positively related to the distance between the first finger F1 and the second finger F2. That is, the smaller the distance between the first finger F1 and the second finger F2, the darker the color of the reference object 323 is, but the disclosure is not limited thereto.

In FIG. 3C, the shown scenario can be understood as corresponding to the timing point where the pinch part of the pinch-and-release gesture is almost detected.

In FIG. 3D, the shown scenario can be understood as corresponding to the situation where the pinch part of the pinch-and-release gesture is detected and slightly moved toward the first direction (e.g., right). In the embodiment, the processor 104 may further move the reference object 323 toward the first direction in the process of the preparation gesture being changed to the first gesture corresponding to the first direction.

As can be seen from FIG. 3D, the reference object 323 is moved toward the first direction, such that the distance between the reference object 323 and the first directional indicator 321 is getting smaller. In one embodiment, the reference object 323 can be merged with the first directional indicator 321 in the process of the preparation gesture being changed to the first gesture corresponding to the first direction, but the disclosure is not limited thereto.

Additionally or alternatively, when the distance between the reference object 323 and the first directional indicator 321 is getting smaller, the color of the first directional indicator 321 can be adjusted accordingly. In one embodiment, the darkness of the color of the first directional indicator 321 can be positively related to the distance between the reference object 323 and the first directional indicator 321. That is, the smaller the distance between the reference object 323 and the first directional indicator 321, the darker the color of the first directional indicator 321 is, but the disclosure is not limited thereto.

Figure 3F:
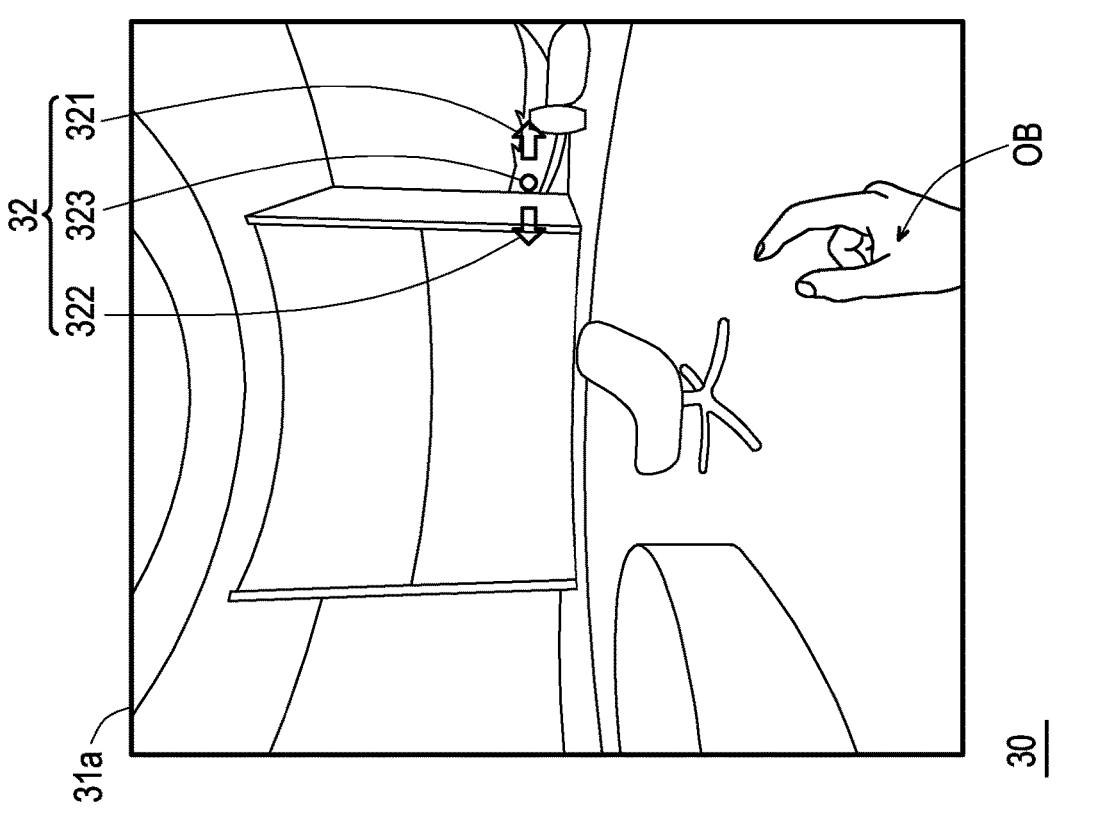
Figure 3E:
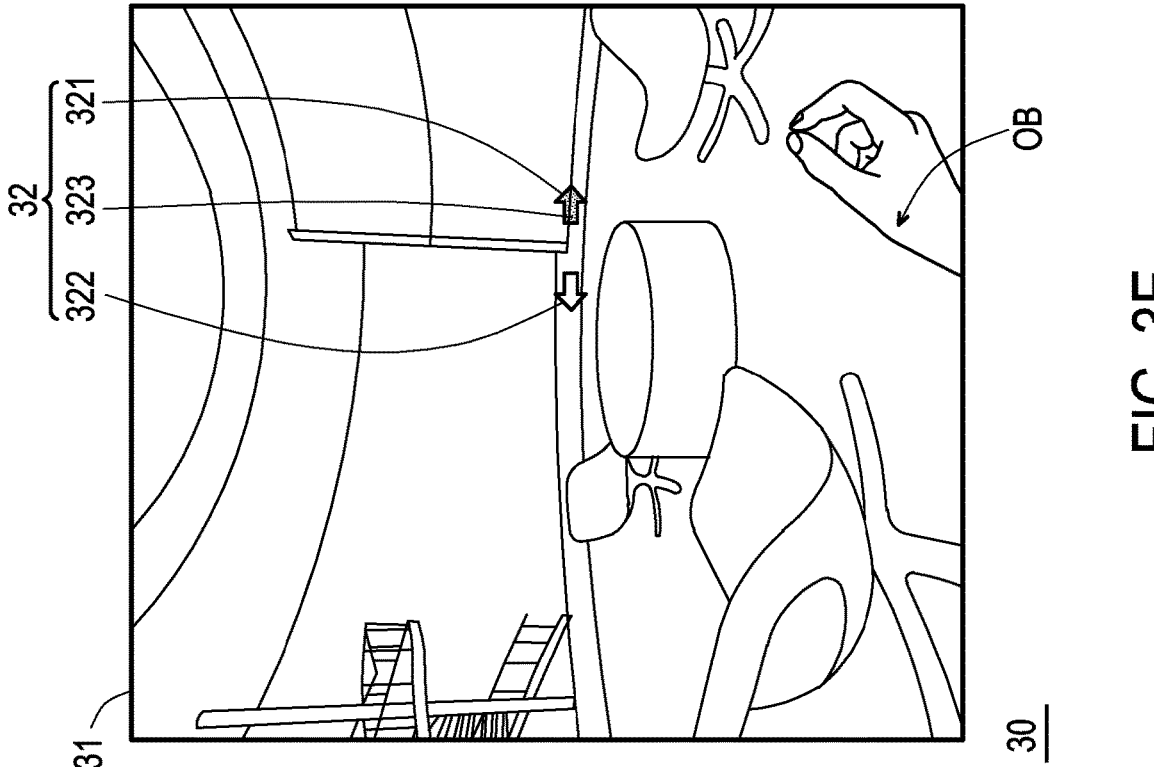

See FIG. 3E, the shown scenario can be understood as corresponding to the situation where the reference object 323 has been merged with the first directional indicator 321, wherein the darkness of the color of the first directional indicator 321 is also increased since the distance between the reference object 323 and the first directional indicator 321 is getting smaller, but the disclosure is not limited thereto.

See FIG. 3F, the shown scenario can be understood as corresponding to the situation where the release part of the pinch-and-release gesture is detected. In this case, the processor 104 accordingly adjust the FOV to correspond to the second view based on the first direction (e.g., right), wherein the FOV corresponding to the second view angle may be the FOV 31*a* in FIG. 3F, but the disclosure is not limited thereto.

In FIG. 3F, the processor 104 can adjust the FOV to correspond to the second view angle based on the first direction by turning the FOV corresponding to the first view angle (e.g., the FOV 31 in FIG. 3E) to the first direction by a predetermined angle, such that the FOV can be adjusted to be the FOV 31*a* in FIG. 3F. In different embodiments, the predetermined angle can be arbitrarily determined based on the requirements of the designer.

In FIG. 3F, the predetermined angle may be 45 degrees, but the disclosure is not limited thereto. That is, the processor 104 may turn the FOV to the right by 45 degrees to switch from the FOV 31 in FIG. 3E to the FOV 31*a* in FIG. 3F, and the switching effect of the FOV can be observed from the position variations of the virtual objects (e.g., furniture and/or walls) in the visual content 30.

From another perspective, the difference between the first view angle and the second view angle can be understood as the predetermined angle, but the disclosure is not limited thereto.

In one embodiment, the FOV seen by the user can be understood as corresponding to the FOV seen by the avatar of the user in the VR world. That is, the FOV 31 in FIG. 3E can be understood as corresponding to the situation where the avatar is facing the first view angle. In this case, the processor 104 may adjust the FOV to correspond to the second view angle based on the first direction by turning the avatar facing the first view angle to the first direction to face the second view angle. In this case, the FOV 31*a* in FIG. 3F can be understood as corresponding to the situation where the avatar has been turned to face the second view angle, but the disclosure is not limited thereto.

Therefore, based on the embodiments of the disclosure, the user can switch the FOV from FOV 31 to FOV 31*a* by sequentially performing the following operations: (1) doing the preparation gesture as shown in FIG. 3B; (2) switching from doing the preparation gesture to doing the pinch gesture and moving the pinch gesture to the first direction as shown in FIG. 3C to FIG. 3E; (3) releasing the pinch gesture as shown in FIG. 3F, where the FOV would be switched/adjusted once the pinch gesture has been released. Accordingly, the user can switch the FOV without actually turn his/her body and/or head, which increases the operating flexibility of experiencing the reality service.

In addition, as can be seen from FIG. 3F, since the hand object OB shows that the hand gesture is the preparation gesture, the processor 104 can display the visual cue 32 as mentioned in the above. In this case, the processor 104 may determine whether the preparation gesture in FIG. 3F has been changed to the first gesture corresponding to the first direction based on the descriptions in the above.

Figure 3H:
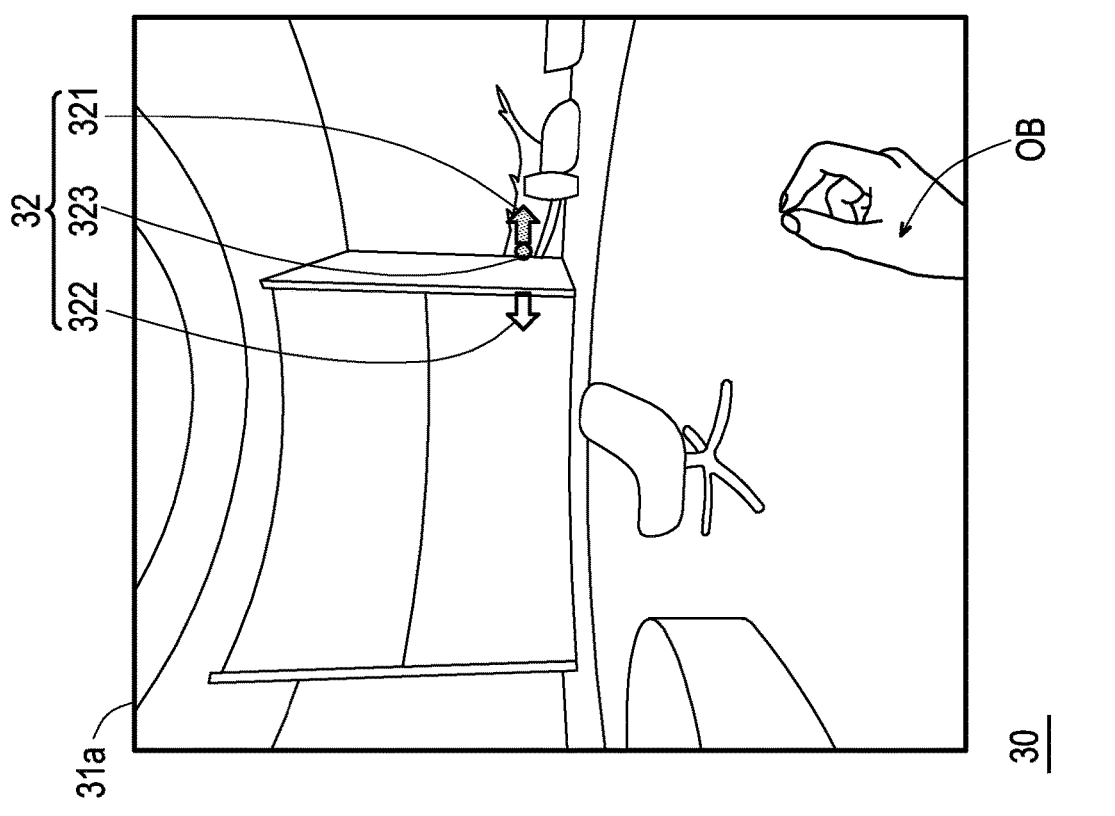
Figure 3G:
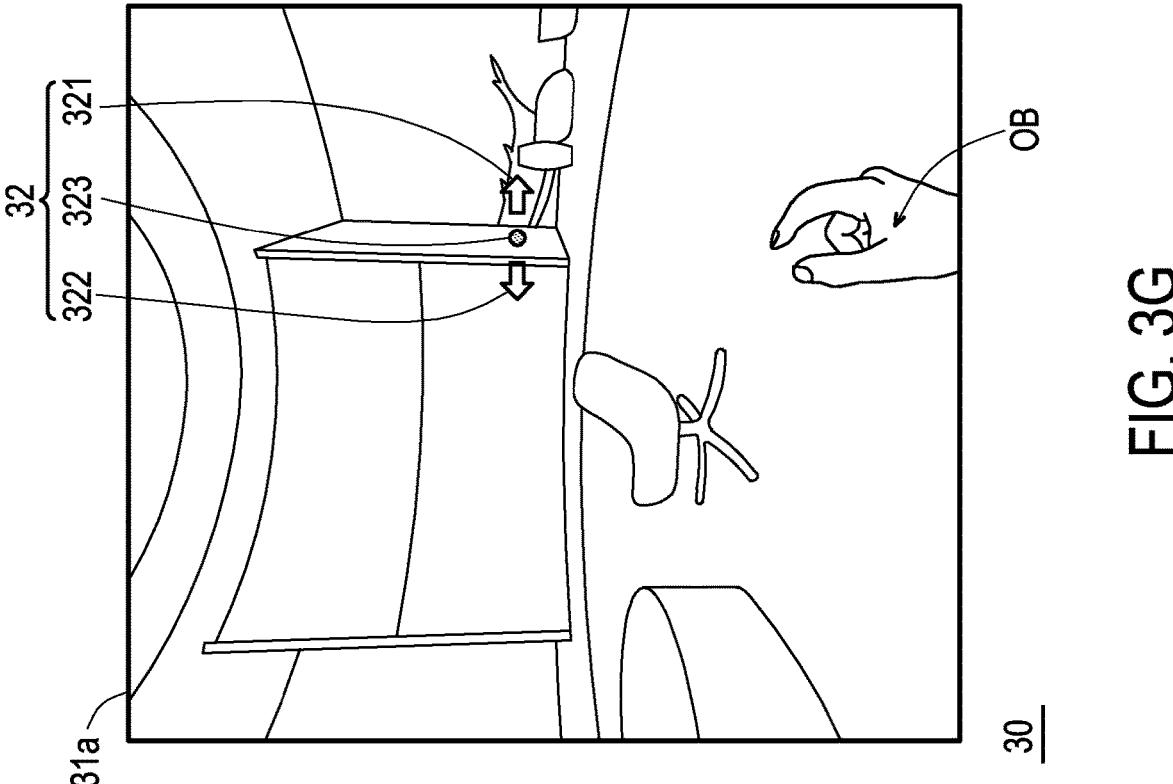

See FIG. 3G, the shown scenario can be understood as corresponding to the timing point where the pinch part of the pinch-and-release gesture is almost detected.

In FIG. 3H, the shown scenario can be understood as corresponding to the situation where the pinch part of the pinch-and-release gesture is detected and moved toward the first direction (e.g., right).

Figure 3I:
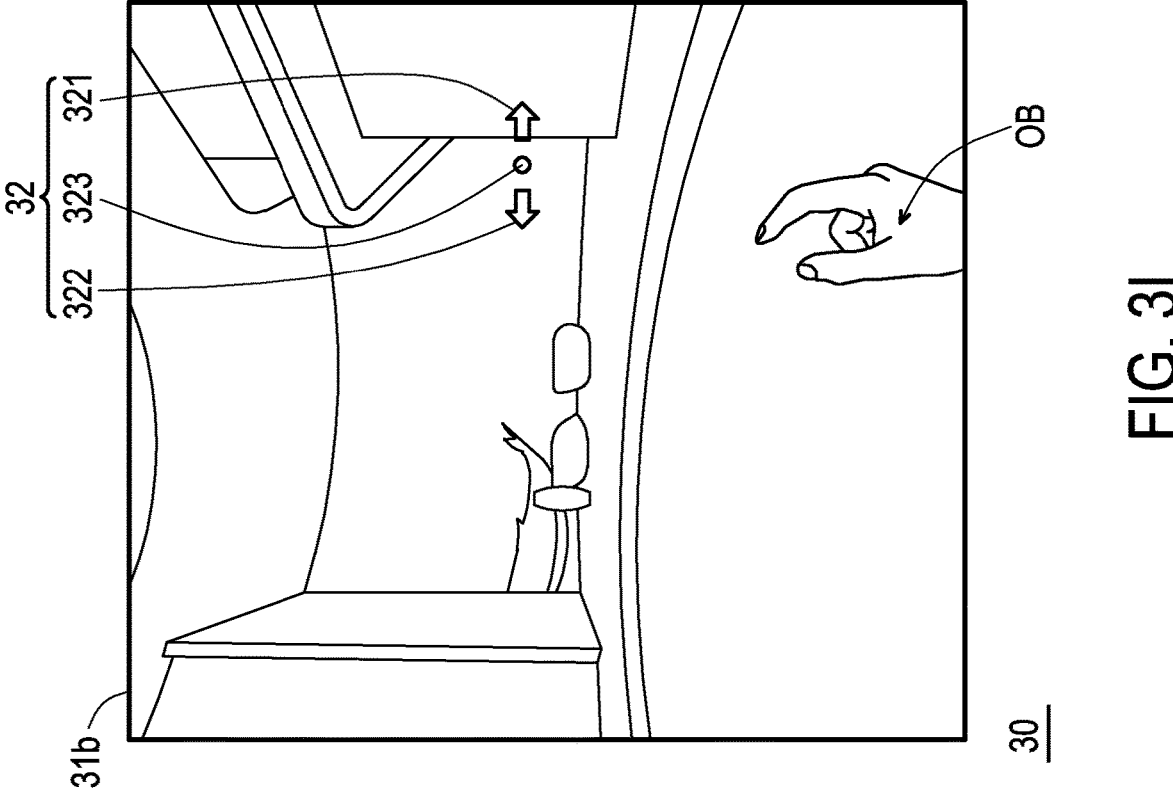

See FIG. 3I, the shown scenario can be understood as corresponding to the situation where the release part of the pinch-and-release gesture is detected. In this case, the processor 104 accordingly adjust the FOV to correspond to a third view based on the first direction (e.g., right), wherein the FOV corresponding to the third view angle may be the FOV 31*b* in FIG. 3I, but the disclosure is not limited thereto.

In FIG. 3I, the processor 104 can adjust the FOV to correspond to the third view angle based on the first direction by turning the FOV corresponding to the second view angle (e.g., the FOV 31*a* in FIG. 3H) to the first direction by the predetermined angle, such that the FOV can be adjusted to be the FOV 31*b* in FIG. 3I.

In FIG. 3I, the processor 104 may turn the FOV to the right by 45 degrees to switch from the FOV 31*a* in FIG. 3G to the FOV 31*b* in FIG. 3I, and the switching effect of the FOV can be observed from the position variations of the virtual objects (e.g., furniture and/or walls) in the visual content 30.

In one embodiment, the FOV seen by the user can be understood as corresponding to the FOV seen by the avatar of the user in the VR world. That is, the FOV 31*a* in FIG. 3G can be understood as corresponding to the situation where the avatar is facing the second view angle. In this case, the processor 104 may adjust the FOV to correspond to the third view angle based on the first direction by turning the avatar facing the second view angle to the first direction to face the third view angle. In this case, the FOV 31*b* in FIG. 3I can be understood as corresponding to the situation where the avatar has been turned to face the third view angle, but the disclosure is not limited thereto.

Therefore, based on the embodiments of the disclosure, the user can switch the FOV from FOV 31*a* to FOV 31*b* by sequentially performing the following operations: (1) doing the preparation gesture as shown in FIG. 3F; (2) switching from doing the preparation gesture to doing the pinch gesture and moving the pinch gesture to the first direction as shown in FIG. 3G to FIG. 3H; (3) releasing the pinch gesture as shown in FIG. 3I, where the FOV would be switched/adjusted once the pinch gesture has been released.

Accordingly, the user can switch the FOV without actually turn his/her body and/or head, which increases the operating flexibility of experiencing the reality service.

In the fourth embodiment where the first gesture corresponding to the first direction is the pinch gesture moving toward the first direction for more than the predetermined time length and/or the predetermined distance, the processor 104 may determine whether the first gesture corresponding to the first direction is maintained after adjusting the FOV to correspond to the second view angle based on the first direction (i.e., step S230).

In one embodiment, in response to determining that the first gesture corresponding to the first direction is maintained after step S230, the processor 104 may maintain the visual cue 32 and adjust the FOV to correspond to the third view angle based on the first direction. That is, if the processor 104 determines that the first gesture corresponding to the first direction is maintained after step S230, the processor 104 may adjust the FOV again, and the processor 104 can keep adjust the FOV until the pinch gesture is detected to be released, but the disclosure is not limited thereto.

In the embodiments of the disclosure, although the above embodiments are described under the assumption where the preparation gesture has been changed to the first gesture corresponding to the first direction, the above solution can be also applied to other embodiments where the preparation gesture has been changed to a second gesture corresponding to the second direction.

See FIG. 4A to FIG. 4E, which show an application scenario according to another embodiment of the disclosure.

Figure 4B:
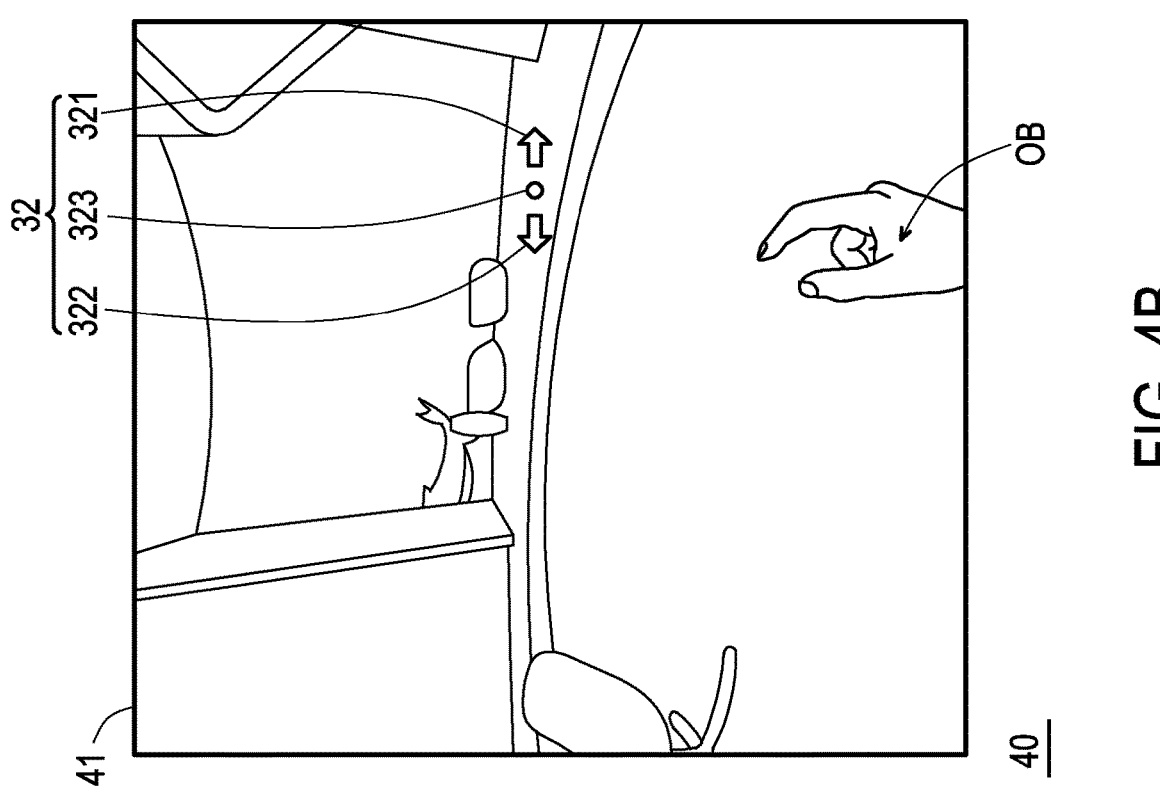
FIG. 4A to FIG. 4E show an application scenario according to another embodiment of the disclosure.
Figure 4A:
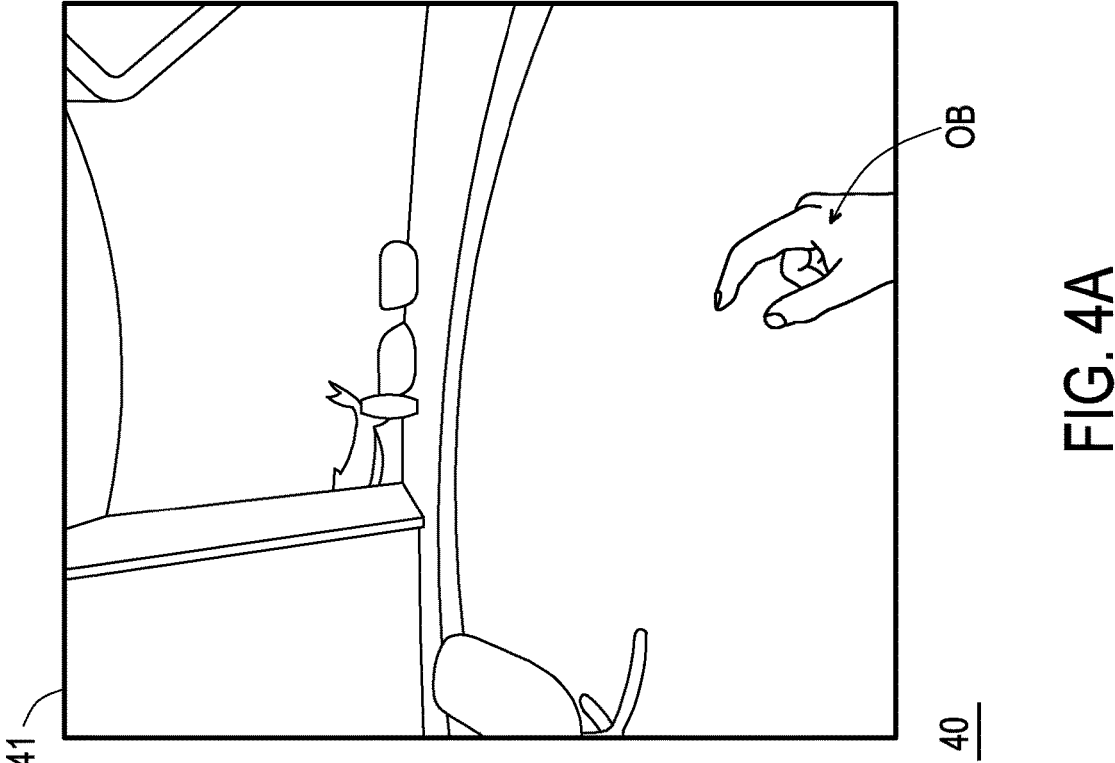

In FIG. 4A, the processor 104 provides a visual content 40 having the FOV corresponding to a first view angle. Noted that the first view angle in FIG. 4A is different from the first view angle considered in FIG. 3A, but the disclosure is not limited thereto. In addition, the processor 104 may further provide the hand object OB rendered based on the tracked hand gesture of the user of the host 200.

In FIG. 4B, the hand gesture presented by the hand object OB can be assumed to be an example of the considered preparation gesture. In this case, the processor 104 may display the visual cue 32 in the visual content 40 in response to determining that the preparation gesture is detected.

In one embodiment, the processor 104 may determine whether the preparation gesture has been changed to the second gesture corresponding to the second direction.

In different embodiments the second gesture corresponding to the second direction can be arbitrarily designed based on the requirements of the designer. In a fifth embodiment, the second gesture corresponding to the second direction may be a pinch-and-release gesture moving toward the second direction. In a sixth embodiment, the second gesture corresponding to the second direction may be a pinch gesture moving toward the second direction for more than a predetermined time length and/or a predetermined distance, but the disclosure is not limited thereto.

Figure 4D:
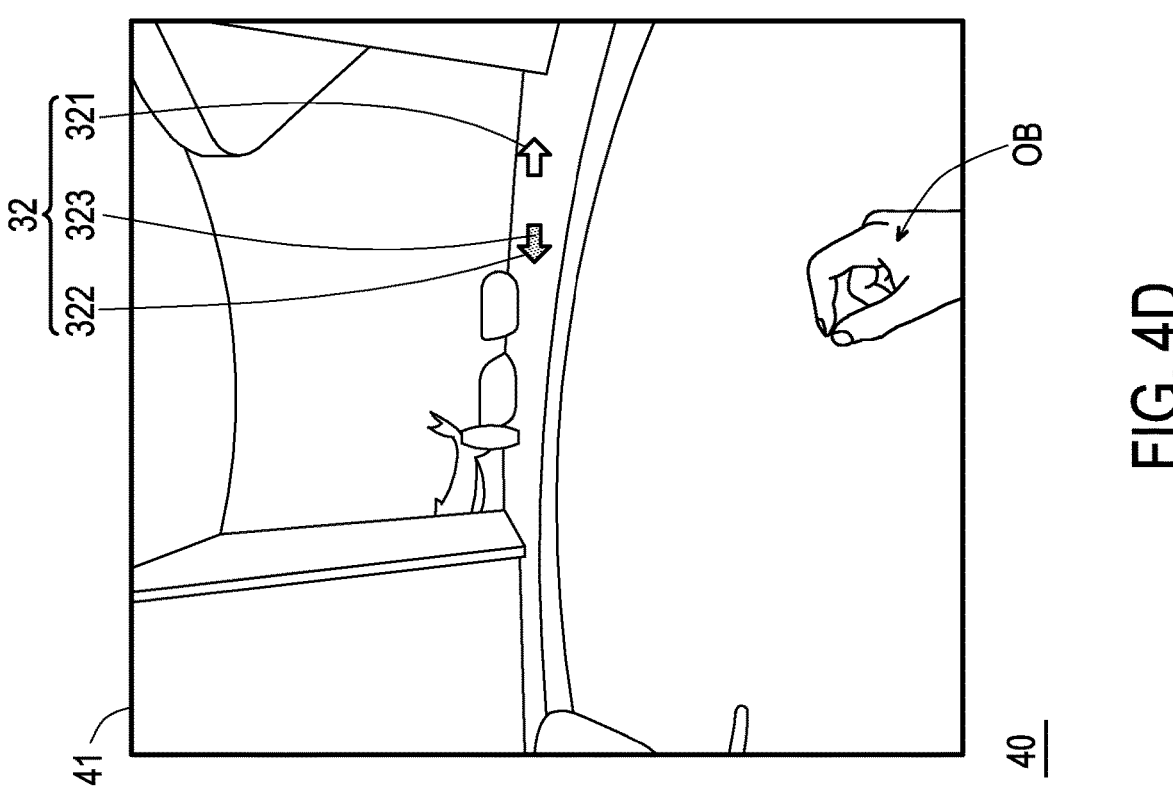
Figure 4C:
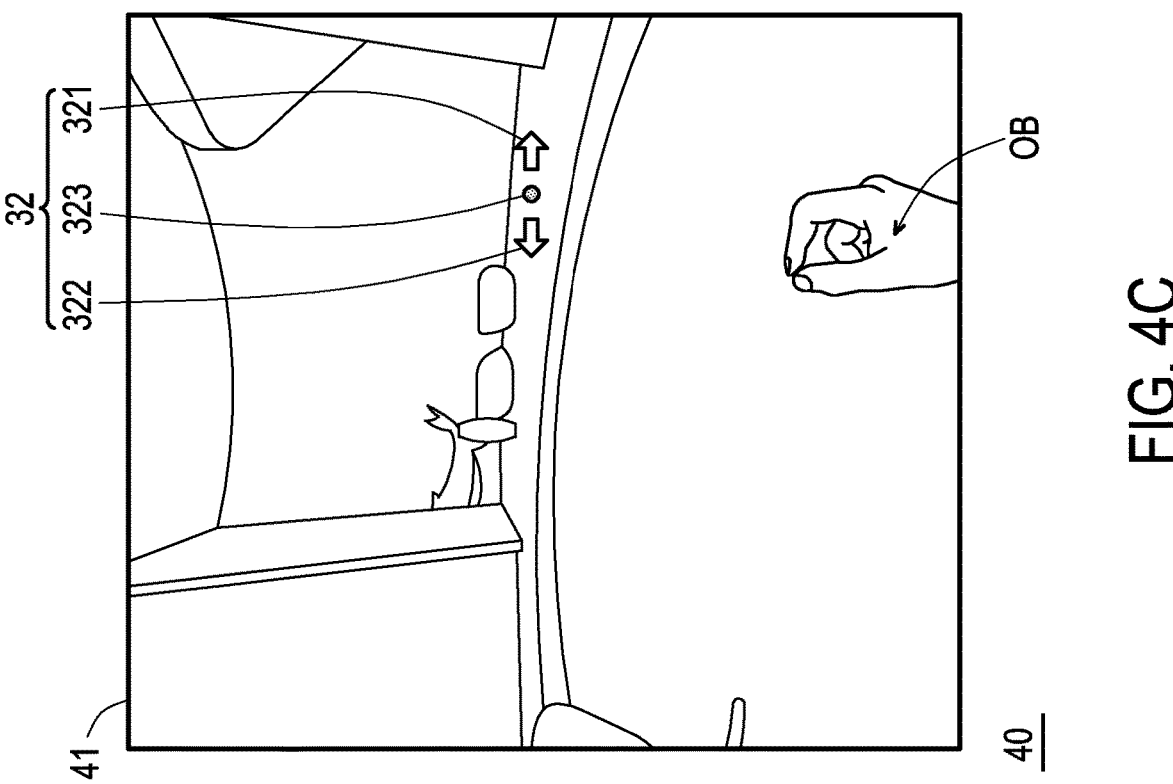

In FIG. 4C, the shown scenario can be understood as corresponding to the timing point where the pinch part of the pinch-and-release gesture is almost detected.

In FIG. 4D, the shown scenario can be understood as corresponding to the situation where the pinch part of the pinch-and-release gesture is detected and slightly moved toward the second direction (e.g., left). In the embodiment, the processor 104 may further move the reference object 323 toward the second direction in the process of the preparation gesture being changed to the second gesture corresponding to the second direction.

As can be seen from FIG. 4D, the reference object 323 is moved toward the second direction, such that the distance between the reference object 323 and the second directional indicator 322 is getting smaller. In one embodiment, the reference object 323 can be merged with the second directional indicator 322 in the process of the preparation gesture being changed to the second gesture corresponding to the second direction, but the disclosure is not limited thereto.

Figure 4E:
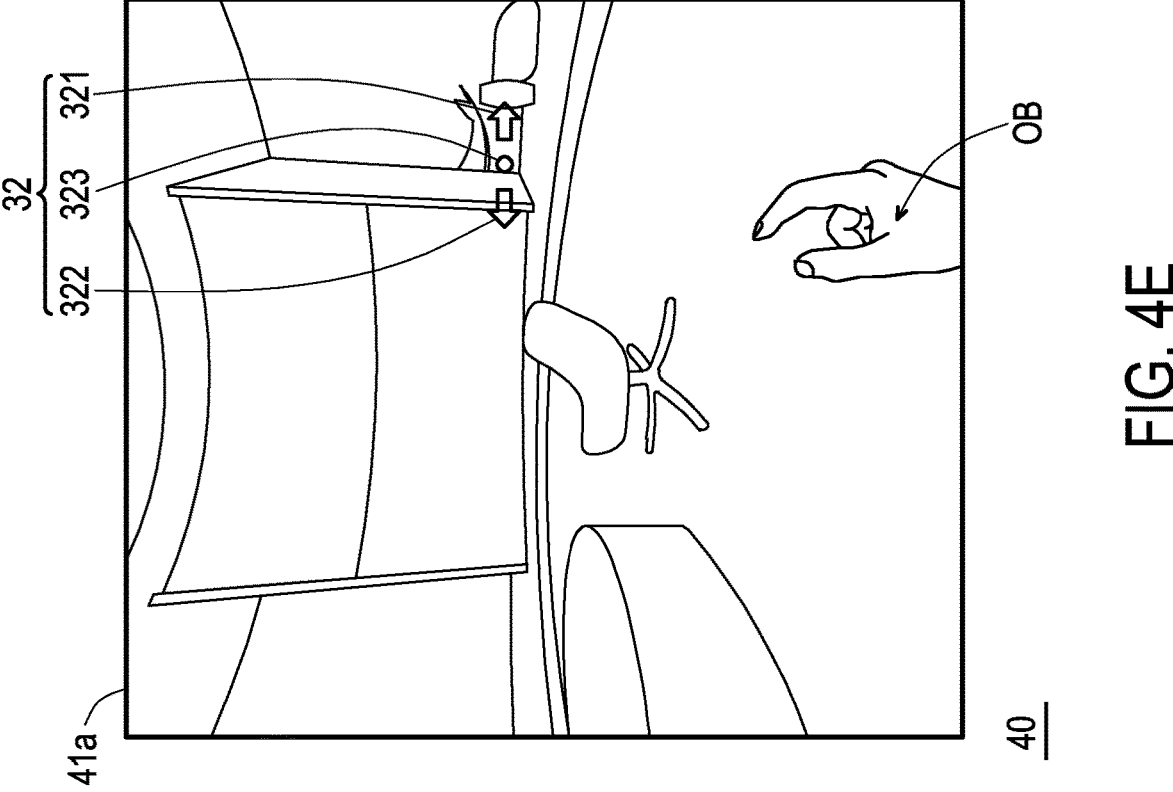

See FIG. 4E, the shown scenario can be understood as corresponding to the situation where the release part of the pinch-and-release gesture is detected. In this case, the processor 104 accordingly adjust the FOV to correspond to the fourth view based on the second direction (e.g., left), wherein the FOV corresponding to the fourth view angle may be the FOV 41a in FIG. 4E, but the disclosure is not limited thereto.

In FIG. 4E, the processor 104 can adjust the FOV to correspond to the fourth view angle based on the second direction by turning the FOV corresponding to the first view angle (e.g., the FOV 41 in FIG. 4D) to the second direction by a predetermined angle, such that the FOV can be adjusted to be the FOV 41a in FIG. 4E. In different embodiments, the predetermined angle can be arbitrarily determined based on the requirements of the designer.

In FIG. 4E, the predetermined angle may be 45 degrees, but the disclosure is not limited thereto. That is, the processor 104 may turn the FOV to the left by 45 degrees to switch from the FOV 41 in FIG. 4D to the FOV 41a in FIG. 4E, and the switching effect of the FOV can be observed from the position variations of the virtual objects (e.g., furniture and/or walls) in the visual content 40.

In one embodiment, the processor 104 may adjust the FOV to correspond to the fourth view angle based on the second direction by turning the avatar facing the first view angle to the second direction to face the fourth view angle. In this case, the FOV 41a in FIG. 4E can be understood as corresponding to the situation where the avatar has been turned to face the fourth view angle, but the disclosure is not limited thereto.

Therefore, based on the embodiments of the disclosure, the user can switch the FOV from FOV 41 to FOV 41a by sequentially performing the following operations: (1) doing the preparation gesture as shown in FIG. 4B; (2) switching from doing the preparation gesture to doing the pinch gesture and moving the pinch gesture to the second direction as shown in FIG. 4C to FIG. 4D; (3) releasing the pinch gesture as shown in FIG. 4E, where the FOV would be switched/adjusted once the pinch gesture has been released. Accordingly, the user can switch the FOV without actually turn his/her body and/or head, which increases the operating flexibility of experiencing the reality service.

Details of implementing the operations in FIG. 4A to FIG. 4E can be referred to the descriptions associated with FIG. 3A to FIG. 3I, which would not be repeated herein.

In the embodiments where the visual cue 32 includes other directional indicators indicating other directions (e.g., up and/or down), the user can use the mechanism similar to the above to adjust the FOV to the desired directions.

The disclosure further provides a computer readable storage medium for executing the method for rendering a virtual object. The computer readable storage medium is composed of a plurality of program instructions (for example, a setting program instruction and a deployment program instruction) embodied therein. These program instructions can be loaded into the host 200 and executed by the same to execute the method for controlling a view angle of a visual content and the functions of the host 200 described above.

In summary, embodiments of the disclosure provide a solution that allows the user to adjust/switch the FOV by sequentially doing the preparation gesture and another gesture corresponding to a specific direction (e.g., right). Since the user can adjust/switch the FOV of the visual content without actually turn his/her body and/or head, the operating flexibility of experiencing the reality service can be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for controlling a view angle of a visual content, executed by a host, comprising:

providing, by the host, the visual content, wherein the visual content has a field of view (FOV) corresponding to a first view angle;

in response to determining that a preparation gesture is detected, displaying, by the host, a visual cue in the visual content, wherein the visual cue indicates a first direction; and in response to determining that the preparation gesture has been changed to a first gesture corresponding to the first direction, adjusting, by the host, the FOV to correspond to a second view angle based on the first direction, wherein the preparation gesture comprises a hand gesture including a first finger and a second finger that are separated from each other, and wherein the determining that the preparation gesture has been changed to the first gesture corresponding to the first direction comprises:

in response to determining that a distance between fingertips of the first finger and the second finger is gradually reduced to substantially zero such that the fingertips touch each other, determining that a pinch part of the first gesture is detected, and in response to determining that, after the hand gesture moved toward the same direction as the first direction indicated by the visual cue while maintaining the pinch part of the first gesture, the fingertips of the first finger and the second finger are separated, determining that a release part of the first gesture is detected, wherein the FOV is adjusted in response to the detection of the release part of the first gesture.

2. The method according to claim 1, further comprising:

tracking the hand gesture of a user of the host; and in response to determining that the hand gesture satisfies a predetermined condition, determining that the preparation gesture is detected.

3. The method according to claim 2, further comprises:

determining a first angle between the first finger and a reference axis and determining a second angle between the second finger and the reference axis;

in response to determining that the first angle and the second angle are within a predetermined angle range, determining that the hand gesture satisfies the predetermined condition.

4. The method according to claim 2, wherein the hand gesture comprises a palm, and the method further comprises:

in response to determining that the palm is within a predetermined sub-range in the FOV, determining that the hand gesture satisfies the predetermined condition.

5. The method according to claim 1, wherein the visual cue comprises a first directional indicator indicating the first direction.

6. The method according to claim 5, wherein the visual cue further comprises a second directional indicator indicating a second direction, wherein the second direction is different from the first direction.

7. The method according to claim 5, wherein the visual cue further comprises a reference object, and the method further comprises:

varying an appearance of the reference object in a process of the preparation gesture being changed to the first gesture corresponding to the first direction.

8. The method according to claim 7, wherein varying the appearance of the reference object in the process of the preparation gesture being changed to the first gesture corresponding to the first direction comprises:

reducing a size of the reference object in the process of the preparation gesture being changed to the first gesture corresponding to the first direction.

9. The method according to claim 7, wherein varying the appearance of the reference object in the process of the preparation gesture being changed to the first gesture corresponding to the first direction comprises:

changing a color of the reference object in the process of the preparation gesture being changed to the first gesture corresponding to the first direction.

10. The method according to claim 5, wherein the visual cue further comprises a reference object, and the method further comprises:

moving the reference object toward the first direction in the process of the preparation gesture being changed to the first gesture corresponding to the first direction.

11. The method according to claim 1, wherein the first gesture corresponding to the first direction is a pinch gesture moving toward the first direction for more than a predetermined time length or a predetermined distance.

12. The method according to claim 1, wherein after adjusting the FOV to correspond to the second view angle based on the first direction, the method further comprises:

in response to determining that the first gesture corresponding to the first direction is maintained, maintaining the visual cue and adjusting the FOV to correspond to a third view angle based on the first direction.

13. The method according to claim 1, wherein a difference between the first view angle and the second view angle is a predetermined angle.

14. The method according to claim 1, wherein adjusting the FOV to correspond to the second view angle based on the first direction comprises:

turning the FOV corresponding to the first view angle to the first direction by a predetermined angle.

15. The method according to claim 1, wherein the visual content shows a virtual reality world provided by the host.

16. The method according to claim 15, wherein the virtual reality world comprises an avatar corresponding to a user of the host and facing the first view angle, and adjusting the FOV to correspond to the second view angle based on the first direction comprises:

turning the avatar facing the first view angle to the first direction to face the second view angle.

17. The method according to claim 1, wherein the visual content comprises a hand object corresponding to the hand gesture tracked by the host.

18. A host, comprising:

a non-transitory storage circuit, storing a program code; and a processor, coupled to the non-transitory storage circuit and accessing the program code to perform:

providing a visual content, wherein the visual content has a field of view (FOV) corresponding to a first view angle;

in response to determining that a preparation gesture is detected, displaying a visual cue in the visual content, wherein the visual cue indicates a first direction; and in response to determining that the preparation gesture has been changed to a first gesture corresponding to the first direction, adjusting the FOV to correspond to a second view angle based on the first direction, wherein the preparation gesture comprises a hand gesture including a first finger and a second finger that are separated from each other, and wherein the determining that the preparation gesture has been changed to the first gesture corresponding to the first direction comprises:

in response to determining that a distance between fingertips of the first finger and the second finger is gradually reduced to substantially zero such that the fingertips touch each other, determining that a pinch part of the first gesture is detected, and in response to determining that, after the hand gesture moved toward the same direction as the first direction indicated by the visual cue while maintaining the pinch part of the first gesture, the fingertips of the first finger and the second finger are separated, determining that a release part of the first gesture is detected, wherein the FOV is adjusted in response to the detection of the release part of the first gesture.

19. A non-transitory computer readable storage medium, the computer readable storage medium recording an executable computer program, the executable computer program being loaded by a host to perform steps of:

providing a visual content, wherein the visual content has a field of view (FOV) corresponding to a first view angle;

in response to determining that a preparation gesture is detected, displaying a visual cue in the visual content, wherein the visual cue indicates a first direction; and in response to determining that the preparation gesture has been changed to a first gesture corresponding to the first direction, adjusting the FOV to correspond to a second view angle based on the first direction, wherein the preparation gesture comprises a hand gesture including a first finger and a second finger that are separated from each other, and wherein the determining that the preparation gesture has been changed to the first gesture corresponding to the first direction comprises:

in response to determining that a distance between fingertips of the first finger and the second finger is gradually reduced to substantially zero such that the fingertips touch each other, determining that a pinch part of the first gesture is detected, and in response to determining that, after the hand gesture moved toward the same direction as the first direction indicated by the visual cue while maintaining the pinch part of the first gesture, the fingertips of the first finger and the second finger are separated, determining that a release part of the first gesture is detected, wherein the FOV is adjusted in response to the detection of the release part of the first gesture.

* * * * *